(12) United States Patent
Mori et al.

(10) Patent No.: US 8,021,094 B2
(45) Date of Patent: Sep. 20, 2011

(54) WORK HANDLING MECHANISM AND WORK INSPECTION SYSTEM

(75) Inventors: Kyoichi Mori, Ashigarakami-gun (JP); Fujio Yamasaki, Ashigarakami-gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 368 days.

(21) Appl. No.: 12/244,494

(22) Filed: Oct. 2, 2008

(65) Prior Publication Data

US 2009/0095058 A1 Apr. 16, 2009

(30) Foreign Application Priority Data

Oct. 11, 2007 (JP) ................................ 2007-265536

(51) Int. Cl.
*B65H 5/00* (2006.01)

(52) U.S. Cl. ............. 414/222.13; 198/347.1; 198/347.4; 414/222.07; 414/222.12; 414/222.01; 901/7; 901/8

(58) Field of Classification Search ............. 414/222.01, 414/222.07, 222.12, 222.13, 223.01, 223.02; 901/6, 7, 8; 198/339.1, 347.1, 347.3, 347.4, 198/570

See application file for complete search history.

(56) References Cited

U.S. PATENT DOCUMENTS

| 5,174,067 | A | * | 12/1992 | Hasegawa et al. | ............ 451/291 |
| 6,186,736 | B1 | * | 2/2001 | Lust et al. | ...................... 414/800 |
| 6,368,435 | B1 | * | 4/2002 | Kempf | ........................... 156/64 |

FOREIGN PATENT DOCUMENTS

JP 4-122554 4/1992

* cited by examiner

*Primary Examiner* — Donald Underwood
(74) *Attorney, Agent, or Firm* — Mattingly & Malur, PC

(57) ABSTRACT

In the present invention, through a provision of a relay stand including a first relaying point, a second relaying point and a plurality of work mounting bases, a discharge/feed process of works between the relay stand and the work feed container and the work accommodation container is performed at the first relaying point and a load/unload process of works between the relay stand and the plurality of work inspection machines is performed at the second relaying point.

12 Claims, 4 Drawing Sheets

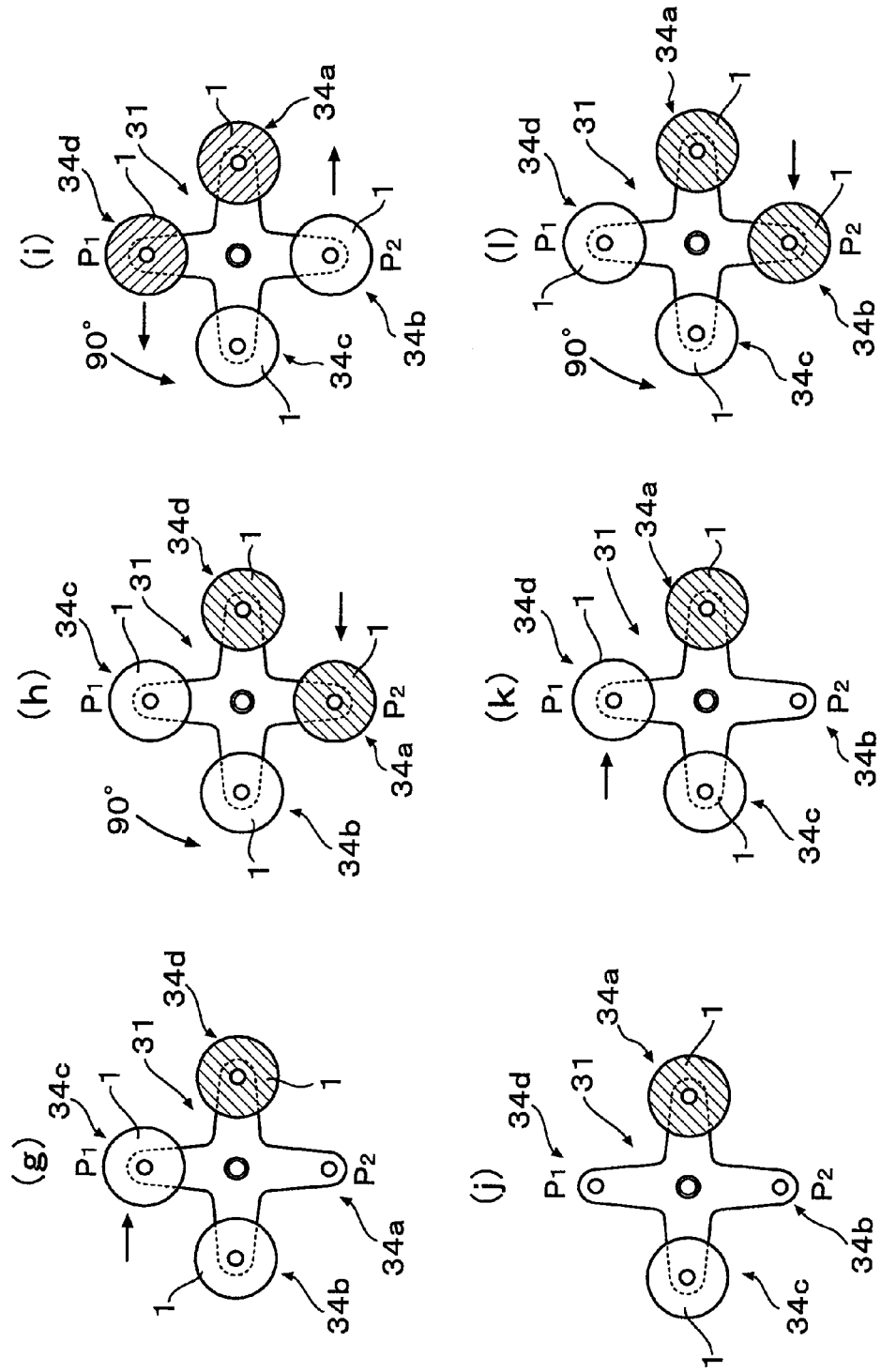

WORK HANDLING MECHANISM AND WORK INSPECTION SYSTEM

FIELD OF THE INVENTION

The present invention relates to a work handling mechanism and a work inspection system and more specifically, in a disk inspection system in which by means of handling robots a magnetic disk (herein after will be referred to as disk) before inspection is taken out from a feed side disk cassette (herein after will be referred to as feed cassette) to load the same on a magnetic disk inspection machine (herein after will be referred to as disk inspection machine) and a disk after inspection is unloaded from the disk inspection machine, classified according to the inspection result and accommodated in a classed disk cassette (herein after will be referred to as classed cassette) corresponding to the classification, relates to a disk handling mechanism that enhances an inspection efficiency when inspecting small sized disks required of a comparatively short inspection time in parallel at a plurality of inspection machines.

BACKGROUND ART

In an inspection of disks, disks before inspection accommodated in a feed cassette are taken out one by one and loaded on disk inspection machines, and when the inspection is completed, disks after inspection are unloaded from the disk inspection machines and accommodated in one of classed cassettes corresponding to classification according to the inspection result.

In order to enhance the inspection efficiency, when a disk inspection system uses a plurality of disk inspection machines to perform parallel disk inspection, number of disks inspected in a unit of time can be increased. However, when doing so, number of respective cassettes at feed side and at accommodation side increases correspondingly. In such instance, a handling system that efficiently performs an exchange of the respective cassettes and loading and unloading of the disks to the respective disk inspection machines is also necessitated.

Therefore, a disk inspection system in which feed cassettes and classed cassettes are arranged on a turntable has been proposed. In the system, disks before inspection can be continuously fed to a plurality of disk inspection machines and disks completed of the inspection are accommodated in one of the classed cassettes corresponding to the classification according to the inspection result.

For such instance, respective provisions in a disk inspection system of a relaying stand (herein after will be referred to as relay stand) for transferring disks before inspection and a relay stand for disks completed of inspection between the turntable and the plurality of disk inspection machines are disclosed and known in JP-A-4-122554 of the present assignee. The relay stands in this disk inspection system can compensate for a deviation of processing timing at the side of disk inspection machines with respect to disk feed timing from respective cassettes provided at the side of the turntable and disk accommodation timing to the respective cassettes. Further, the transferring distance for loading/unloading disks to the plurality of disk inspection machines is shortened up to the relay stand to thereby enhance the inspection efficiency.

The relay stand disclosed in JP-A-4-122554 is provided in common for the plurality of disk inspection machines. Moreover, the relay stand moves to a predetermined fixed position as a relaying point of disks by a handling robot. Further, since the loading of disks to the respective disk inspection machines has to be performed after disks after inspection are unloaded and detached therefrom, two relay stands, one relay stand for placing a disk of unloaded and the other relay stand for placing a disk before inspection are necessitated and such are respectively provided in the system.

For this reason, this disk inspection system necessitates a moving mechanism of the relay stands in which a disk after inspection set on a first relay stand and a disk before inspection set on a second relay stand are moved to relaying points where handling robots handle respective disks in response to respective transferring timings.

As a result, a disk is kept placed on the relay stand until the handling robot moves to a subsequent disk handling process, which prolongs residence time of the disk on the relay stand. Therefore, for a small disk inspection system in which small disks less than 2.5 inches required of a comparatively short inspection time are inspected in parallel, a problem of reducing inspection efficiency raises.

Further, since the quality of disks has been improved now a day, an inspection of tracks other than thinned out is performed not for an inspection of all tracks partly in view of the density increase of tracks. In this manner, since the inspection time is shortened even for disks of more than 2.5 inches, the residence time of the disk set on the relay stand in the above disk inspection system disturbs efficiency of the disk inspection.

SUMMARY OF THE INVENTION

An object of the present invention is to resolve such problem in the conventional art and to provide a work handling mechanism in a work inspection system inspecting works such as disks in parallel that enhances the inspection efficiency of the works.

Another object of the present invention is to provide an inspection system for small works in an inspection system inspecting works in parallel that enhances the inspection efficiency of the works.

A constitution of a work handling mechanism or a work inspection system of the present invention that achieves these objects is provided with, in the work handling mechanism including a relay stand that performs relaying for transferring a work before inspection taken out from a work feed container to one of a plurality of inspection machines and further performs relaying for transferring a work after inspection received from one of the plurality of inspection machines to a work accommodation container, the relay stand includes a first relaying point, a second relaying point and a plurality of work mounting bases and, when one of the plurality of work mounting bases is placed at the first relaying point, the relay stand receives a work before inspection thereon and when another of the plurality of work mounting bases is placed at the second relaying point, the relay stand receives a work after inspection thereon, a mounting base moving mechanism which transfers a work before inspection to the second relaying point as well as transfers a work after inspection to the first relaying point by moving a work mounting base located at the first relaying point to the second relaying point and a work mounting base located at the second relaying point to the first relaying point, a first handling robot which takes out a work before inspection from the work feed container and mounts the same on a work mounting base located at the first relaying point after transferring a work after inspection from the work mounting base located at the first relaying point to the work accommodation container, and a second handling robot which transfers a work after inspection from one of the plurality of inspection machines to a work mounting base located at the second relaying point and mounts the same thereon after transferring a work before inspection from the work mounting base located at the second relaying point to one of the plurality of inspection machines.

In the present invention as has been explained above, through the provision of the relay stand including the first relaying point, the second relaying point and the plurality of work mounting bases, a discharge/feed process of works between the relay stand and the work feed container and the work accommodation container is performed at the first relaying point and a load/unload process of works between the relay stand and the plurality of work inspection machines is performed at the second relaying point.

In the present invention, at the first relaying point, after transferring a work after inspection to the work accommodation container, a work before inspection is received on the work mounting base from the work feed container. At the second relaying point, after transferring a work before inspection from the work mounting base to one of the plurality of inspection machines, a work after inspection is received on the work mounting base from one of the plurality of inspection machines.

Further, in the present invention, the plurality of work mounting bases provided at the relay stand move alternatively between the first relaying point and the second relaying point through a drive by the mounting base moving mechanism, thereby, a work at the first relaying point to be fed is transferred to the second relaying point and oppositely a work at the second relaying point to be discharged is transferred at the same time to the first relaying point.

Further, in this instance, when constituting the mounting base moving mechanism as a rotative mechanism and when rotating the work mounting bases therewith, the works are transferred at the same time between the first relying point and the second relaying point, and the efficiency of work handling process is further enhanced.

Thereby, with regard to the work feed/discharge process, a successive feed of a work before inspection after discharge of a work after inspection can be realized through the work mounting base at the first relaying point. With regard to the load/unload in the work handling process at the side of the work inspection machines, a successive feed of a work before inspection after discharge of a work after inspection can be realized through the work mounting base at the second relaying point.

As a result, in the present invention, the feed/discharge or oppositely the discharge/feed of a work before inspection and a work after inspection can be performed successively and since the waiting time of a work at the relay stand until the same is transferred to the next stage is decreased, the work inspection efficiency of the work inspection system in which works are inspected in parallel can be enhanced.

In particular, when the work is a small disk, the processing efficiency of the disk inspection system is particularly enhanced.

DETAILED DESCRIPTION OF THE EMBODIMENT

Figure 1:
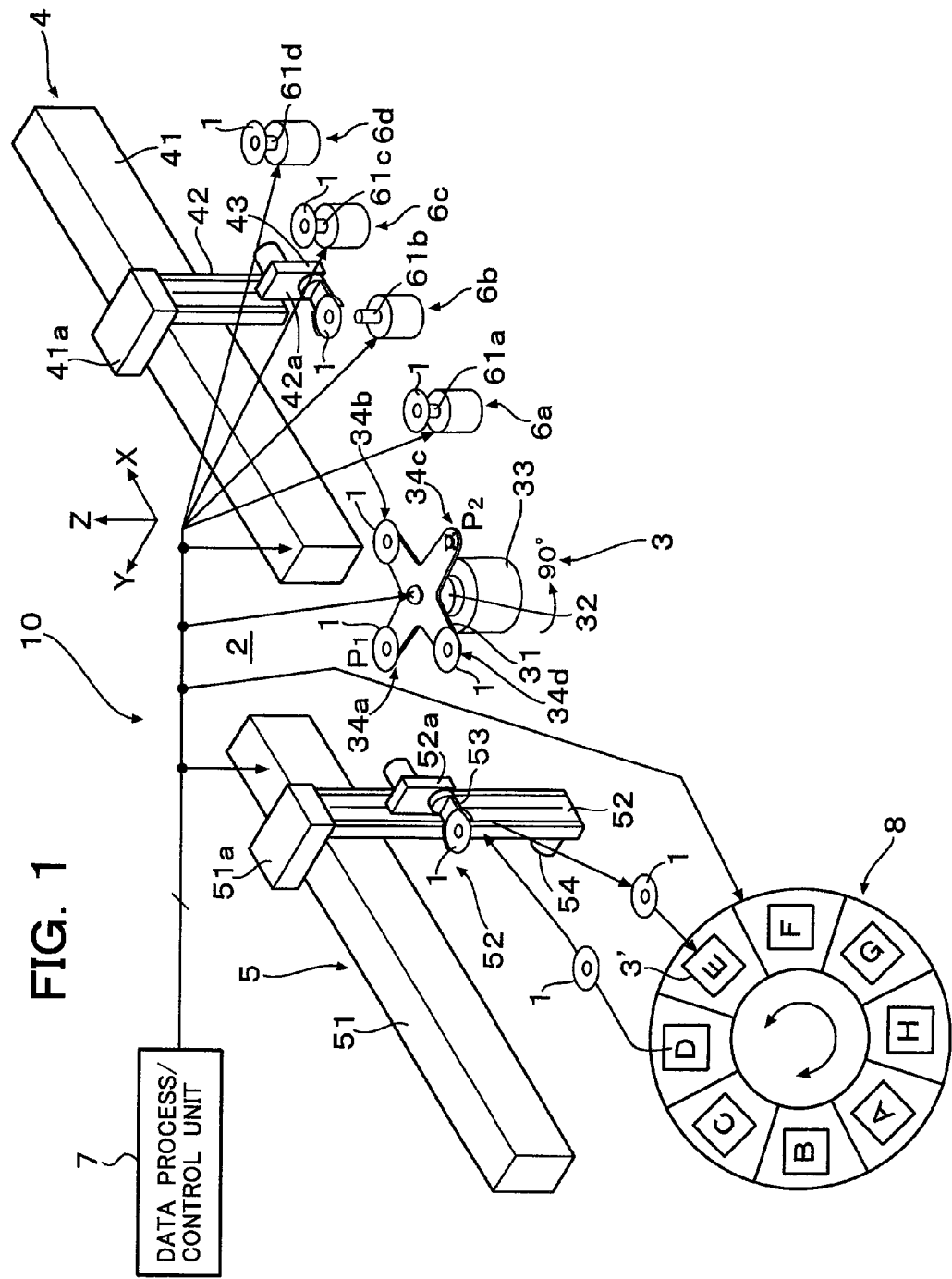
FIG. 1 is a constitutional diagram of an embodiment of a disk inspection system in which a work handling mechanism of the present invention is applied.

Numeral 10 is a disk inspection system, wherein 1 is a disk, 2 is a disk handling mechanism, 6 is an inspection stage, 7 is a data process/control unit, 8 is a cassette accommodation turntable on which feed cassettes and accommodation cassettes are mounted.

The disk handling mechanism 2 is constituted by a rotatable relay stand 3, a disk handling robot 4 at inspection side and a disk handling robot 5 at cassette side. At the inspection stage 6, disk inspection machines 6a~6d are provided.

In the present embodiment, between the cassette accommodation turntable 8 and the respective disk inspection machines 6a~6d, the rotatable relay stand 3 is provided on which a disk 1 before inspection or a disk 1 after inspection is mounted. The rotatable relay stand 3 includes crossed arms 31 and the four top ends of the crossed arms 31 respectively constitute disk mounting bases 34a~34d. When the crossed arms 31 are rotated, two opposing mounting bases among the four disk mounting bases 34a~34d are respectively positioned at positions of two relaying points, in that a relaying point P1 (herein after will be referred to as point P1) and a relaying point P2 (herein after will be referred to as point P2). The points P1 and P2 are disposed on a same circumference and the rotatable relay stand 3 rotates the disk mounting bases 34a~34d at the same time.

Further, in the present embodiment, although four disk inspection machines 6a~6d are provided, any plural number can be selected therefor. Likely, with regard to the number of disk mounting bases 34a~34d, any plural number can be selected therefor and it is not required to select four so as to correspond to the number of the disk inspection machines. The number of arms can be increased or decreased according to the number of disk mounting bases.

Figure 2:
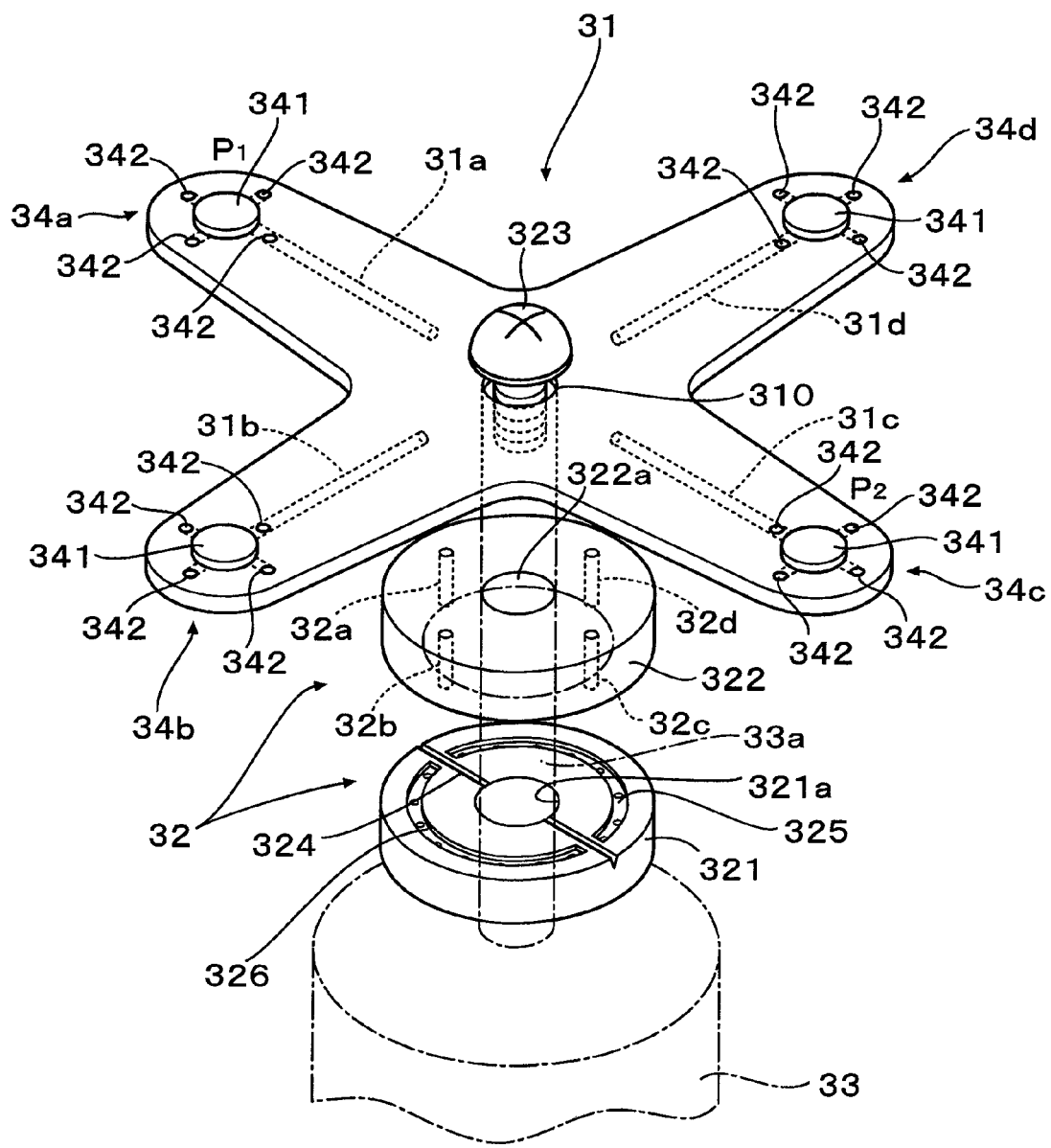
FIG. 2 is an exploded perspective view showing a relationship between crossed arms and a suction mechanism in a rotatable relay stand of a disk handling mechanism, FIG. 3A(a)~(f) are plane views of a rotatable relay stand at several moments for explaining operation in a disk handling processing from an initial setting operation until entering into a normal operation, and FIG. 3B(g)~(l) are plane views of the rotatable relay stand at several moments for explaining the normal operation in the disk handling processing.

The rotatable relay stand 3 is constituted by the crossed arms 31, a rotative suction mechanism 32 and a stepping motor 33 for rotating the crossed arms 31. As shown in FIG. 2, the disk mounting bases 34a~34d positioned at the top end sides of the crossed arms 31 are respectively provided with mechanisms for holding disks 1 through suction. Further, the rotative suction mechanism 32 and the stepping motor 33 constitute a rotative mechanism in the present embodiment.

The crossed arms 31 as shown in FIGS. 1 and 2 are rotatively driven in anticlockwise direction by a unit of 90° by the stepping motor 33. The disk mounting base (the top end side of the crossed arms 31) set at the position of point P1 serves as a mounting base for the disk feed/discharge at the cassette side and the disk mounting base (the top end side of the crossed arms 31) set at the position of point P2 serves as a mounting base for the disk load/unload at the disk inspection machine side.

FIG. 2 is an exploded perspective view showing a relationship between the crossed arms 31 and the suction mechanism 32 in the rotatable relay stand 3. As shown in FIG. 2, each of the disk mounting bases 34a~34d is provided with a disk shaped protrusion 341 to which a center opening portion 1a of the respective disks 1 is fitted and at the root of the protrusion 341 four suction holes 342 which suck the chamfered portion of the respective disks 1.

The two opposing disk mounting bases among the four disk mounting bases 34a~34d are successively and selectively positioned at positions of point P1 and point P2 through the drive of the stepping motor 33.

Herein, the positions of point P1 and point P2 are spaced apart along the direction of Y axis by a distance between the top ends of the opposing arms in the crossed arms 31 and locate on a same coordinate position of X axis.

The rotative suction mechanism 32 disposed at the bottom side center portion of the crossed arms 31 is constituted by a stator disk plate 321 and a rotor disk plate 322 rotatably mounted on the stator disk plate 321, and is attached to a rotatable shaft 33a of the stepping motor 33. The rotatable shaft 33a passes through a center hole 321a of the stator disk plate 321, further passes through a center hole 322a of the rotor disk plate 322 above the stator disk plate 321, reaches the crossed arms 31 and is fitted in a center hole 310 of the crossed arms 31. Then the rotatable shaft 33a is secured to the center portion of the crossed arms 31 by a screw 323 from the upper side thereof. Thereby, the crossed arms 31 and the rotor disk plate 322 are rotatively driven by the stepping motor 33 via the rotatable shaft 33a.

Further, the rotatable shaft 33a loosely fits with the center hole 321a of the stator disk plate 321 but closely fits or couples through a key groove with center hole 322a of the rotor disk plate 322 and the center hole 310 of the crossed arms 31. Thereby, the rotor disk plate 322 and the crossed arms 31 rotate integrally with the rotatable shaft 33a in the rotating direction of the rotatable shaft 33a.

In contrast, the stator disk plate 321 is secured to the housing side of the stepping motor 33 and does not rotate when the rotatable shaft 33a rotates. On the surface of the stator disk plate 321 an open groove 324 running along a straight line passing the center hole 321a and semicircular suction grooves 325 and 326 formed at both sides of the open groove 324 are provided. The open groove 324 faces and communicates with atmosphere and extends linearly in a V shape. The open groove 324 is provided so as to position on a line connecting the relaying points of point P1 and point P2. The V shaped open groove 324 releases the suction of disks 1. On the other hand, at the bottoms of the suction grooves 325 and 326, a plurality of suction holes are bored. These suction holes are connected to such as a vacuum pump (not shown) via a conduit (not shown) to suck air and to always keep the suction grooves 325 and 326 in negative pressure.

The crossed arms 31 are provided with four communication holes 31a~31d which respectively communicate with the suction holes 342 on the respective disk mounting bases 34a~34d. The communication holes 31a~31d are respectively formed in a manner to orient from the center portion of the crossed arms 31 to the top end sides inside the respective arms.

The rotor disk plate 322 is provided with suction holes 32a~32d in a manner so as to correspond to the positions of the respective arms. The respective top end ports of the suction holes 32a~32d fit to the respective center side ports of the communication holes 31a~31d. Thereby, the suction holes 32a~32d respectively communicate with the communication holes 31a~31d. Thus the respective suction holes 32a~32d in the rotor disk plate 322 communicate with the suction holes 342 on the respective disk mounting bases 34a~34d.

The rotor disk plate 322 and the crossed arms 31 are rotated in step by a unit angle of 90° by the stepping motor 33. Through every rotation of 90° by the stepping motor 33 opposing two suction holes among the suction holes 32a~32d in the rotor disk plate 322 are positioned on the open groove 324. The remaining two suction holes are positioned on the semicircular suction grooves 325 and 326. The suction holes 342 to which the two suction holes among the suction holes 32a~32d positioned on the open groove 324 respectively communicate are placed in atmospheric pressure and the suction holes 342 to which the remaining two suction holes positioned on the suction grooves 325 and 326 respectively communicate are placed in a suction state under negative pressure.

Therefore, among the respective disks 1 mounted on the disk mounting bases 34a~34d, since the suction holes 342 on the disk mounting bases corresponding to the two suction holes among the suction holes 32a~32d positioned on the open groove 324 is rendered to atmospheric pressure, the suction of the disks 1 mounted on the disk mounting bases is released. Since the suction holes 342 on the disk mounting bases corresponding to the remaining two suction holes is rendered to negative pressure for suction, the disks 1 mounted on these disk mounting bases are placed in suction state. Moreover, since the suction grooves 325 and 326 are in a semicircular shape, during the rotation of the rotor disk plate 322 including immediately after starting the rotation, the suction states for the disks 1 mounted on the disk mounting bases of which suction holes 342 communicates with the remaining two suction holes are respectively maintained so as to permit transferring the disks 1 through rotation.

Now, returning to FIG. 1, the respective disk inspection machines 6a~6d are constituted by such as respective spindles 61a~61d and respective head carriages (not shown), and inspect disks 1 mounted on the respective spindles 61a~61d through control of the data process/control unit 7.

The cassette turntable 8 is sectioned into a plurality of areas, and feed cassettes A D filled with disks before inspection and classed cassettes F~H accommodating disks after inspection are respectively mounted on predetermined sectioned areas corresponding thereto. Then, when one of the classed cassettes in which disks after inspection are filled is discharged, a new classed cassette is mounted on the vacated position. On the other hand, when one of the feed cassettes A~D is vacated, a new feed cassette filled with disks before inspection is set at the vacated position.

The load/unload of disks on to the disk inspection machines 6a~6d is performed by the disk handling robot 4. The take out and accommodation of disks 1 from the respective cassettes is performed by the disk handling robot 5 at the cassette side.

The disk handling robot 4 is constituted by an in X axis moving mechanism 41, a moving stand 41a for the in X axis moving mechanism 41 with an in Y axis direction position correcting mechanism, an in Z axis moving mechanism 42 provided on the moving stand 41a and an outer circumference chuck mechanism 43 for chucking the outer circumference of a disk and attached to a moving stand 42a of the in Z axis moving mechanism 42. The disk handling robot 4 handles a disk 1 by moving the outer circumference chuck mechanism 43 along X axis as well as moving the same up and down in Z axis between a disk mounting base (one of disk mounting bases 34a~34d) set at a relaying position of point P2 and the disk inspection machines. In this instance, the disk handling robot 4 reciprocates the outer circumference chuck mechanism 43 between the disk mounting base set at the relaying position of point P2 and the respective disk inspection machines 6a~6d.

Namely, when the outer circumference chuck mechanism 43 is at the side of the disk inspection machines, and when the disk inspection has been completed at one of the respective disk inspection machines 6a~6d, the outer circumference chuck mechanism 43 chucks the outer circumference of a disk 1 on the disk inspection machine of which disk inspection has been completed, to receive the disk 1, moves to a disk mounting base positioned at point P2 and transfers the disk 1 after inspection to the disk mounting base at the relaying position of point P2 to mount the same thereon. Then, when the crossed arms 31 are rotated by 90° through control by the data process/control unit 7 and the subsequent disk mounting base is positioned at point P2, the outer circumference chuck mechanism 43 receives a disk 1 before inspection from this disk mounting base, transfers the same to the side of the disk inspection machines and load the same on a disk inspection machine from which a disk 1 is detached due to inspection completion.

Thus the outer circumference chuck mechanism 43 returns to the side of the disk inspection machines. As a result, after a disk inspection has been completed at one of the disk inspection machines 6a~6d and a disk after inspection has been discharged on the rotatable relay stand 3, a disk before inspection is immediately fed to that disk inspection machine.

The disk handling robot 5 at the cassette side is constituted by an in X axis moving mechanism 51, a moving stand 51a for the in X axis moving mechanism 51 with an in Y axis direction position correcting mechanism, an in Z axis moving mechanism 52 provided on the moving stand 51a, an outer circumference chuck mechanism 53 attached to a moving base 52a of the in Z axis moving mechanism 52 and a rotative mechanism 54 for lifting down the outer circumference chuck mechanism 53 in vertical direction by rotating the moving base 52a by 90° in anticlockwise direction by the rotative mechanism 54.

The disk handling robot 5 at the cassette side causes to reciprocate the outer circumference chuck mechanism 53 along X axis and to move the same vertically along Z axis between the disk mounting base at the relaying position of point P1 and the accommodation cassettes and the feed cassettes on the cassette accommodation turntable 8. The disk handling robot 5 at the cassette side receives a disk 1 after inspection from the disk mounting base at the relaying position of point P1 and accommodates the same in a concerned classed cassette, and thereafter receives a disk 1 before inspection from the feed cassette and mounts the same on the disk mounting base at the relaying position of point P1.

Further, as seen from FIG. 1, the outer circumference chuck mechanism 43 in the in X axis moving mechanism 41 and the outer circumference chuck mechanism 53 in the in X axis moving mechanism 51 are respectively arranged at front and back sides of the crossed arms 31 in the rotatable relay stand 3 so as to dispose the same therebetween. The outer circumference chuck mechanism 53 chucks the outer circumference of a disk 1 and reciprocates between the rotatable relay stand 3 and the feed cassette or the classed cassette. Further, when transferring a disk 1 to and from the feed cassette or the classed cassette, the chucked disk 1 is lifted down. The lifting down is performed because the feed cassette and the classed cassette respectively accommodate disks 1 therein vertically with a predetermined gap.

Now, the handling process of transferring disks 1 before inspection between the feed cassettes A~D and the disk inspection machines 6a~6d and of transferring disks 1 after inspection between the disk inspection machines 6a~6d and the classed cassettes (accommodation cassettes) E~H by the disk handling robots 4 and 5 will be explained with reference to FIGS. 3A and 3B.

Figure 3A:
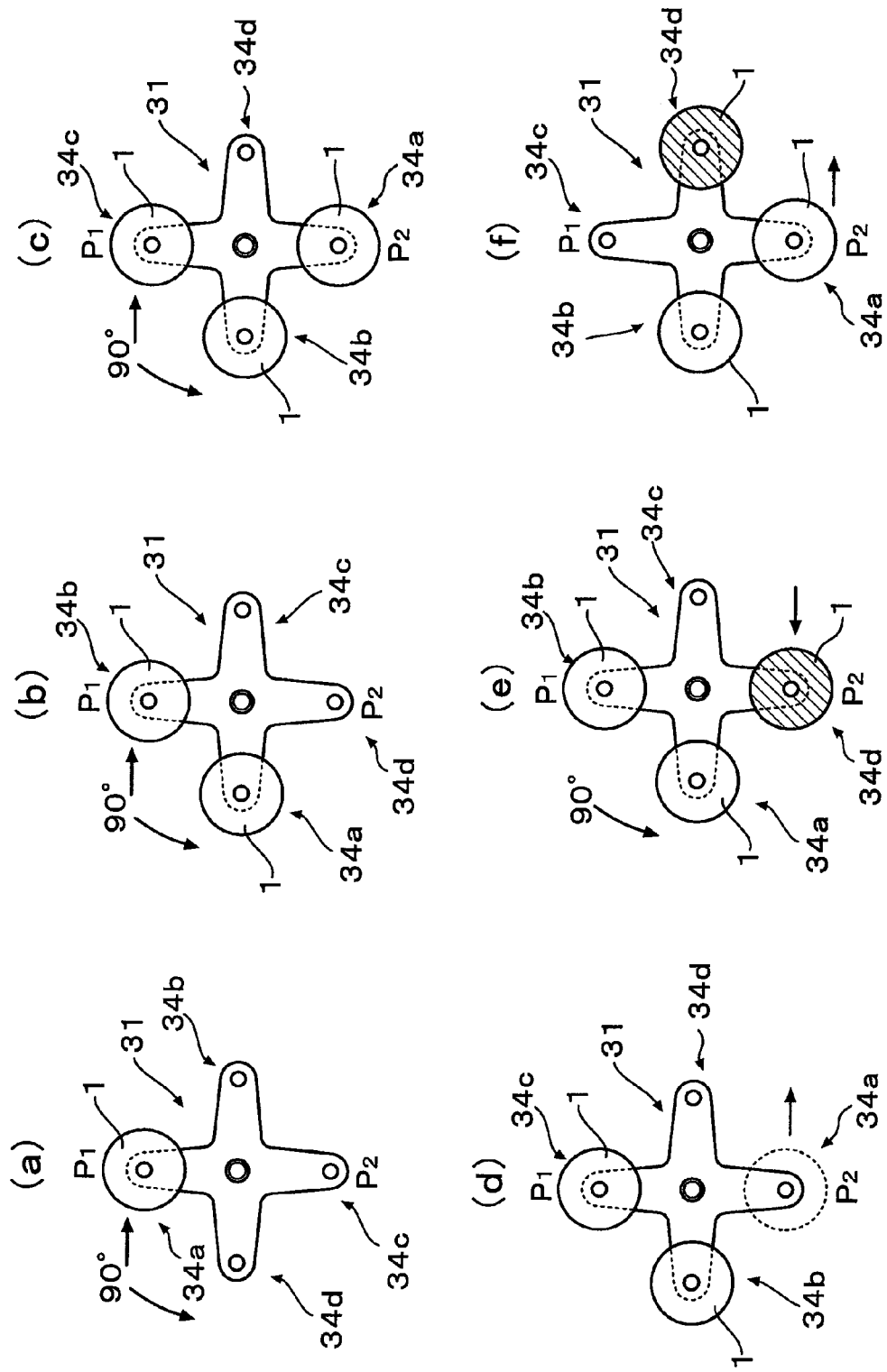

FIG. 3A(a)~(f) are for explaining an initial setting operation, and relate to loading disks 1 before inspection to the respective four disk inspection machines 6a~6d. Further, FIG. 3A(a)~(f) and FIG. 3B(g)~(l) are plane views of the crossed arms 31 seen from upward thereof.

Now, the initial setting process will be explained for the first time, wherein it is assumed that the disk mounting base 34a is located at the relaying position of point P1 in FIG. 1 and the disk 1 mounted thereon is an object of the handling process in the rotatable relay stand 3 for the discharge/feed of disks at the cassette side.

For the first time, as shown in FIG. 3A(a), a disk 1 before inspection is transferred from a feed cassette by the outer circumference chuck mechanism 53 and mounted on the disk mounting base 34a.

Subsequently, the crossed arms 31 are rotatively driven by 90° in anticlockwise direction by the data process/control unit 7. As result, the disk mounting base 34b is located at the relaying position of point P1 and the disk mounting base 34a positions at the left side of the crossed arms 31 in a condition of holding the disk 1 thereon by sucking from the start of the rotation. Then, another disk 1 before inspection is transferred from a feed cassette by the outer circumference chuck mechanism 53 and mounted on the disk mounting base 34b (see FIG. 3A(b)).

The crossed arms 31 are rotatively driven by further 90° in anticlockwise direction by the data process/control unit 7. As result, the disk mounting base 34c is located at the relaying position of point P1 and the disk mounting base 34b positions at the left side of the crossed arms 31 in a condition of holding the disk 1 thereon by sucking from the start of the rotation. At this instance, the disk mounting base 34a rotates to the relaying position of point P2 (the lower side position of the crossed arms 31) in a condition of sucking the disk 1 and wherein the sucking condition of the disk 1 is released.

Subsequently, a disk 1 before inspection is transferred from a feed cassette by the outer circumference chuck mechanism 53 and mounted on the disk mounting base 34c (see FIG. 3A(c)). At this moment, as shown in FIG. 3A (d), the disk 1 before inspection on the disk mounting base 34a is chucked by the outer circumference chuck mechanism 43, transferred to one of the disk inspection machines 6a~6d where no disk is mounted by the disk handling robot 4 and is mounted in the spindle thereof.

When repeating the rotation of the crossed arms 31 by 90° in anticlockwise direction by the data process/control unit 7 in the above manner and disks 1 before inspection are mounted on all of the disk inspection machines 6a~6d, a condition of waiting completion of disk inspection is reached as shown in FIG. 3A(d). However, the disk mounting base locating at the relaying position of point P2 (the lower side position of the crossed arms 31) at this moment is not the disk mounting base 34a but 34d, because the disks 1 have been already transferred four times (see FIG. 3A(e)).

Further, at this moment, different from FIG. 3A(e), no disk is mounted on the disk mounting base 43d at the relaying position of point P2 (the lower side position of the crossed arms 31)

The above is the initial setting process for loading the disks 1 before inspection to the respective four disk inspection machines 6a~6d.

When the disk inspection is completed in one of the respective disk inspection machines 6a~6d, the disk 1 after inspection is detached from the concerned disk inspection machine. The disk 1 unloaded from the disk inspection machine through chucking by the outer circumference chuck mechanism 43 is transferred to the relaying position of point P2 (the lower side position of the crossed arms 31) by the disk handling robot 4 and mounted on the disk mounting base 34*d* at the point P2 (see FIG. 3A(e)).

Further, hatched disks 1 in the drawing indicate disks after inspection that is also true in the followings.

A rotation of 90° of the crossed arms 31 herein after is performed by the data process/control unit 7 when a logical product condition is fulfilled that a disk 1 before inspection is mounted on the disk mounting base at the position of the point P1 (the upper side position of the crossed arms 31) and a disk 1 after inspection is mounted on the disk mounting base at the position of point P2 (the lower side position of the crossed arms 31).

Therefore, the mounting of the disk 1 after inspection on the disk mounting base at the relaying position of point P2 is waited until the disk inspection in one of the disk inspection machines 6*a*~6*d* is completed. This waiting time is normally longer than the time after a disk 1 after inspection at the relaying position of point P1 (see FIG. 3B(i)) is discharge and until a disk 1 before inspection is fed to the relaying position of point P1 and mounted on the disk mounting base thereat (see FIG. 3B(k)) Therefore, in a normal process, the crossed arms 31 are rotatively driven by 90° in anticlockwise direction by the data process/control unit 7 at a timing after a disk 1 after inspection is mounted on the disk mounting base located at the relaying position of point P2.

The above is the 90° rotating operation of the rotatable relay stand 3 in a steady state. Therefore, a disk handling process at the rotatable relay stand 3 under this condition will be explained herein below.

As shown in FIG. 3A(e), when a disk 1 after inspection is mounted on the disk mounting base 34*d*, the data process/control unit 7 rotatively drives the crossed arms 31 by 90° in anticlockwise direction to assume a condition as shown in FIG. 3A(i). The disk 1 after inspection mounted on the disk mounting base 34*d* locates at the right side of the crossed arms 31 and the disk mounting base 34*a* mounting a disk 1 before inspection comes to the relaying position of point P2. Further, the disk mounting base 34*c* is located at the relaying position of point P1.

The disk 1 before inspection on the disk mounting base 34*a* at the relaying position of point P2 as shown in FIG. 3A(f) is transferred to a disk inspection machine from which a disk 1 completed of the inspection is detached by the disk handling robot 4. After the disk 1 before inspection is loaded on the disk inspection machine from which the disk has been detached, the disk handling robot 4 enters in period of waiting for inspection completion by one of the respective disk inspection machines 6*a*~6*d*.

At the same time as above, a disk 1 before inspection is transferred from a feed cassette to the relaying position of point P1 by the disk handling robot 5 and is mounted on the disk mounting base 34*c* (see FIG. 3B(g)).

Meantime, the disk inspection is completed at one of the respective disk inspection machines 6*a*~6*d*. At this time, the disk 1 after inspection is detached from the concerned disk inspection machine by the disk handling robot 4. The detached disk 1 is chucked by the outer circumference chuck machine 43, transferred to the relaying position of point P2 by the disk handling robot 4 and mounted on the disk mounting base 34*a* located at point P2 (see FIG. 3B(h)).

When the disk 1 after inspection is mounted on the disk mounting base 34*a*, the data process/control unit 7 rotatively drives the crossed arms 31 by 90° in anticlockwise direction. Thus, the crossed arms 31 assume a condition as shown in FIG. 3B(i), the disk 1 before inspection mounted on the disk mounting base 34*b* comes to the relaying position of point P2 at the lower side of the crossed arms 31 and the disk 1 after inspection mounted on the disk mounting base 34*a* is located at the right side of the crossed arms 31. Then, the disk 1 after inspection mounted on the disk mounting base 34*d* is located on the relaying position of point P1.

Subsequently, a disk 1 before inspection mounted on the disk mounting base 34*b* is transferred by the disk handling robot 4 to a disk inspection machine from which a disk 1 completed of the inspection is detached and loaded thereon. At the same time, a disk 1 after inspection mounted on the disk mounting base 34*d* at the relaying position of point P1 is chucked by the outer circumference chuck mechanism 53 and is transferred to a classed cassette by the disk handling robot 5 (see FIG. 3B(j)).

On the other hand, the disk handling robot 4 enters in period of waiting for inspection completion by one of the respective disk inspection machines 6*a*~6*d*. In this inspection waiting period, a disk 1 before inspection is transferred to the relaying position of point P1 by the disk handling robot 5 and mounted on the disk mounting base 34*d* (see FIG. 3B(k)).

Meantime, when the disk inspection is completed at one of the respective disk inspection machines 6*a*~6*d*, the disk 1 after inspection is detached from the concerned disk inspection machine. The detached disk 1 is chucked by the outer circumference chuck machine 43, transferred to the relaying position of point P2 by the disk handling robot 4 and mounted on the disk mounting base 34*b* located at point P2 (see FIG. 3B(l)).

Then, When the disk 1 after inspection is mounted on the disk mounting base 34*b*, the data process/control unit 7 rotatively drives the crossed arms 31 by 90° in anticlockwise direction. Thus, the crossed arms 31 assume the previous condition as shown in FIG. 3B(i).

However, at this moment, the disk mounting base 34*c* locates at the position of point P2 and the disk mounting base 34*a* locates at the position of point P1. In that, the crossed arms 31 assume a condition where the same rotate further 90° in anticlockwise direction from the previous condition as shown in FIG. 3B(i).

After this, in response to rotative drive of the crossed arms 31 by 90° in anticlockwise direction by the data process/control unit 7 at a timing after a disk 1 after inspection is mounted on a disk mounting base at the relaying position of point P2 at the lower side of the crossed arms 31, the conditions as shown in FIG. 3B(i)~(l) are successively repeated with regard to the respective disk mounting bases 34*a*~34*d*. As a result, the feed of disks 1 before inspection, discharge of disks 1 after inspection and the load/unload of the disks 1 to the disk inspection machines are continuously performed.

Further, the selection of a classed cassette is performed by the data process/control unit 7 according to the inspection result of the disk 1 after inspection mounted on the disk mounting base 34*d*.

Further, when the discharge of a disk 1 after inspection to the cassette side and the feed of a disk 1 before inspection at point P1 are delayed from the mounting of a disk 1 after inspection at the point P2, the rotative drive by 90° in anticlockwise direction of the crossed arms 31 is performed after the delayed feed at the point P1 of a disk 1 before inspection from the cassette side is completed.

Although four disk mounting bases are used in the embodiment as has been explained hitherto, the number of disk mounting bases is not limited to four, but the number of two or more than two is sufficient in the present invention.

Further, in the embodiment, as the accommodation cassettes for accommodating disks after inspection, a plurality of classed cassettes corresponding to the classification according to the inspection result are prepared on the turntable. However, in the present invention, a single accommodation cassette to be prepared is also acceptable. Because even with the single accommodation cassette, data management which allocates the inspection result depending on the disk accommodation positions in the single accommodation cassette can be realized in a data processing unit.

Further, in the present invention, two kinds of accommodation cassettes can be provided, in that one for disks after inspection determined as good and the other for disks after inspection determined as no good.

Still further, in the embodiment, as an embodiment to which the work handling mechanism is applied, a disk inspection system is exemplified, however, the present invention is, of course, applicable such as to a magnetic head inspection system in which magnetic heads serve as works and to handlings of other electronic parts (works).

The invention claimed is:

1. A work handling mechanism comprising:
a relay stand that performs relaying for transferring a work before inspection taken out from a work feed container to one of a plurality of inspection machines and further performs relaying for transferring a work after inspection received from one of the plurality of inspection machines to a work accommodation container,
wherein the relay stand includes a first relaying point, a second relaying point and a plurality of work mounting bases and, when one of the plurality of work mounting bases is placed at the first relaying point, the relay stand receives a work before inspection thereon and when another of the plurality of work mounting bases is placed at the second relaying point, the relay stand receives a work after inspection thereon,
the work handling mechanism further comprising:
a mounting base moving mechanism which transfers the work before inspection to the second relaying point as well as transfers the work after inspection to the first relaying point by moving a work mounting base located at the first relaying point to the second relaying point and a work mounting base located at the second relaying point to the first relaying point,
a first handling robot which takes out a work before inspection from the work feed container and mounts the same on the work mounting base located at the first relaying point after transferring the work after inspection from the work mounting base located at the first relaying point to the work accommodation container,
a second handling robot which transfers a work after inspection from one of the plurality of inspection machines to the work mounting base located at the second relaying point and mounts the same thereon after transferring the work before inspection from the work mounting base located at the second relaying point to one of the plurality of inspection machines, and
a control unit which controls rotation of the mounting base moving mechanism as well as controls the relay stand, the first handling robot and the second handling robot.

2. A work handling mechanism according to claim 1, wherein at the same time when one of the plurality of work mounting bases is located at the first relaying point, another of the plurality of work mounting bases is located at the second relaying point, and the work before inspection located at the second relaying point is transferred to one of the plurality of inspection machines from which the work after inspection has been detached.

3. A work handling mechanism according to claim 2, wherein the mounting base moving mechanism is a rotative mechanism, the work is a disk, the work mounting base is a disk mounting base, the work accommodation container is an accommodation cassette for the disks, the inspection machine is a disk inspection machine and the plurality of disk mounting bases are arranged on a circumference passing the first relaying point and the second relaying point with the rotation center of the rotative mechanism as the center thereof and are rotated at the same time by the rotative mechanism.

4. A work handling mechanism according to claim 3, wherein the rotative mechanism is rotatively driven by a predetermined angle under a condition that when the disk mounting base located at the first relaying point receives a disk before inspection as well as the disk mounting base located at the second relaying point receives a disk after inspection.

5. A work handling mechanism according to claim 4, wherein the first handling robot and the second handling robot respectively include an outer circumference chuck mechanism which chucks the outer circumference of the disk, the first handing robot and the second handling robot are respectively move along a single axis, the respective outer circumference chuck mechanism are disposed at respective sides of the rotative mechanism so as to locate the same therebetween and the plurality of disk mounting bases hold the inner circumferential side of the disks.

6. A work handling mechanism according to claim 5, wherein the plurality of disk mounting bases of equal to or more than four are provided on the circumference with a predetermined interval and each of the disk mounting bases includes suction holes which suck the inner circumference of the disk in negative pressure, and when each of the disk mounting bases is located at the first relaying point or the second relaying point, the suction of the disk through the suction holes in each of the disk mounting bases is released.

7. A work handling mechanism according to claim 6, wherein the rotative mechanism includes a groove which causes the suction holes to communicate with atmospheric pressure for respectively releasing the suction of the disk before inspection and the disk after inspection.

8. A work handling mechanism according to claim 7, wherein the disk is a magnetic disk, the rotative mechanism includes crossed arms coupled to the rotative shaft thereof, the plurality of disk mounting bases are respectively provided at the top end portions of the crossed arms, the first handling robot and the second handling robot respectively move along a single axis and the plurality of disk inspection machines are arranged along a single axis with a predetermined interval.

9. A work inspection system comprising a work handling mechanism according to claim 1, a plurality of work inspection machines, a work feed container and a work accommodation container, wherein the work accommodation container is provided in plural number to meet classification of the works according to the inspection result thereof.

10. A work inspection system comprising a work handling mechanism according to claim 2, a plurality of work inspection machines, a work feed container and a work accommodation container, wherein the work accommodation container is provided in plural number to meet classification of the works according to the inspection result thereof.

11. A work inspection system comprising a work handling mechanism according to claim 3, a plurality of work inspection machines, a work feed container and a work accommodation container, wherein the work accommodation container is provided in plural number to meet classification of the works according to the inspection result thereof.

12. A work inspection system according to claim 9, further comprising a turntable, wherein the work feed container and the work accommodation container are respectively a work feed cassette and a work accommodation cassette which are mounted on the turntable, and between the turntable and the plurality of the work inspection machines the relay stand is provided.

* * * * *